(12) United States Patent
Schreiter et al.

(10) Patent No.: US 11,060,818 B2
(45) Date of Patent: Jul. 13, 2021

(54) METHOD FOR APPROACHING A TARGET

(71) Applicant: Swarovski-Optik KG., Absam (AT)

(72) Inventors: Gerd Schreiter, Wattenberg (AT); Wolfgang Schwarz, Gnadenwald (AT)

(73) Assignee: Swarovski-Optik KG

( * ) Notice: Subject to any disclaimer, the term of this patent is extended or adjusted under 35 U.S.C. 154(b) by 359 days.

(21) Appl. No.: 16/117,803

(22) Filed: Aug. 30, 2018

(65) Prior Publication Data

US 2019/0063874 A1 Feb. 28, 2019

(30) Foreign Application Priority Data

Aug. 31, 2017 (AT) ................ A50731/2017

(51) Int. Cl.

| | |
|---|---|
| *F41G 1/473* | (2006.01) |
| *G01S 17/48* | (2006.01) |
| *G01C 3/04* | (2006.01) |
| *G01S 17/46* | (2006.01) |
| *G01S 17/10* | (2020.01) |
| *G01C 21/20* | (2006.01) |
| *G01S 7/00* | (2006.01) |
| *G01S 17/86* | (2020.01) |

(52) U.S. Cl.
CPC ............... *F41G 1/473* (2013.01); *G01C 3/04* (2013.01); *G01C 21/20* (2013.01); *G01S 7/006* (2013.01); *G01S 17/10* (2013.01); *G01S 17/46* (2013.01); *G01S 17/48* (2013.01); *G01S 17/86* (2020.01)

(58) Field of Classification Search
CPC .......... F41G 1/473; F41G 3/065; G01S 17/10;
G01S 17/46; G01S 17/48; G01S 17/86;
G01S 17/00; G01S 7/006; G01C 21/20;
G01C 3/04; G01C 3/24; G02B 23/00
See application file for complete search history.

(56) References Cited

U.S. PATENT DOCUMENTS

| | | |
|---|---|---|
| 5,825,480 A | 10/1998 | Udagawa |
| 8,314,923 B2 | 11/2012 | York et al. |
| 9,068,800 B2 | 6/2015 | McHale et al. |

(Continued)

FOREIGN PATENT DOCUMENTS

| | | |
|---|---|---|
| DE | 20111501 U1 | 10/2001 |
| DE | 102009059820 A1 | 6/2011 |
| EP | 2629134 A2 | 8/2013 |

*Primary Examiner* — Mohamed Charioui
(74) *Attorney, Agent, or Firm* — Lerner, David, Littenberg, Krumholz & Mentlik, LLP

(57) ABSTRACT

The invention relates to a target approach method with a long-range optical device comprising an observation optics, a distance measuring device and an orientation determination device, wherein a reference position with a reference distance and a reference angle to the target at a target position is targeted at an intermediate position in an adaptation step by means of the observation optics, while a difference angle between an absolute direction and a reference direction of the long-range optical device is determined by means of the orientation determination device, and a difference distance from the intermediate position to the reference position is determined by means of the distance measuring device, and a target distance and a target angle are determined from the reference distance and the difference distance as well as from the reference angle and the difference angle by a geodetic calculation module.

17 Claims, 8 Drawing Sheets

(56) References Cited

U.S. PATENT DOCUMENTS

| | | | |
|---|---|---|---|
| 9,335,121 B2 | 5/2016 | McHale et al. | |
| 2006/0077375 A1 | 4/2006 | Vermillion et al. | |
| 2011/0288818 A1 | 11/2011 | Thierman et al. | |
| 2012/0105825 A1 | 5/2012 | Gogolla et al. | |
| 2012/0109577 A1 | 5/2012 | Nyhart et al. | |
| 2013/0046461 A1* | 2/2013 | Balloga | G01S 7/4972 701/438 |
| 2013/0096874 A1* | 4/2013 | Laabs | G01C 15/00 702/151 |
| 2013/0329218 A1* | 12/2013 | Vogel | G01C 1/02 356/139.1 |
| 2014/0247439 A1* | 9/2014 | Neier | G01S 17/87 356/4.01 |
| 2015/0355328 A1* | 12/2015 | Maryfield | G01S 7/497 356/8 |
| 2016/0041266 A1* | 2/2016 | Smits | G01S 7/497 356/5.01 |
| 2016/0202021 A1* | 7/2016 | Roman | F41G 3/165 345/633 |
| 2017/0219345 A1* | 8/2017 | Torok | G01S 17/10 |

\* cited by examiner

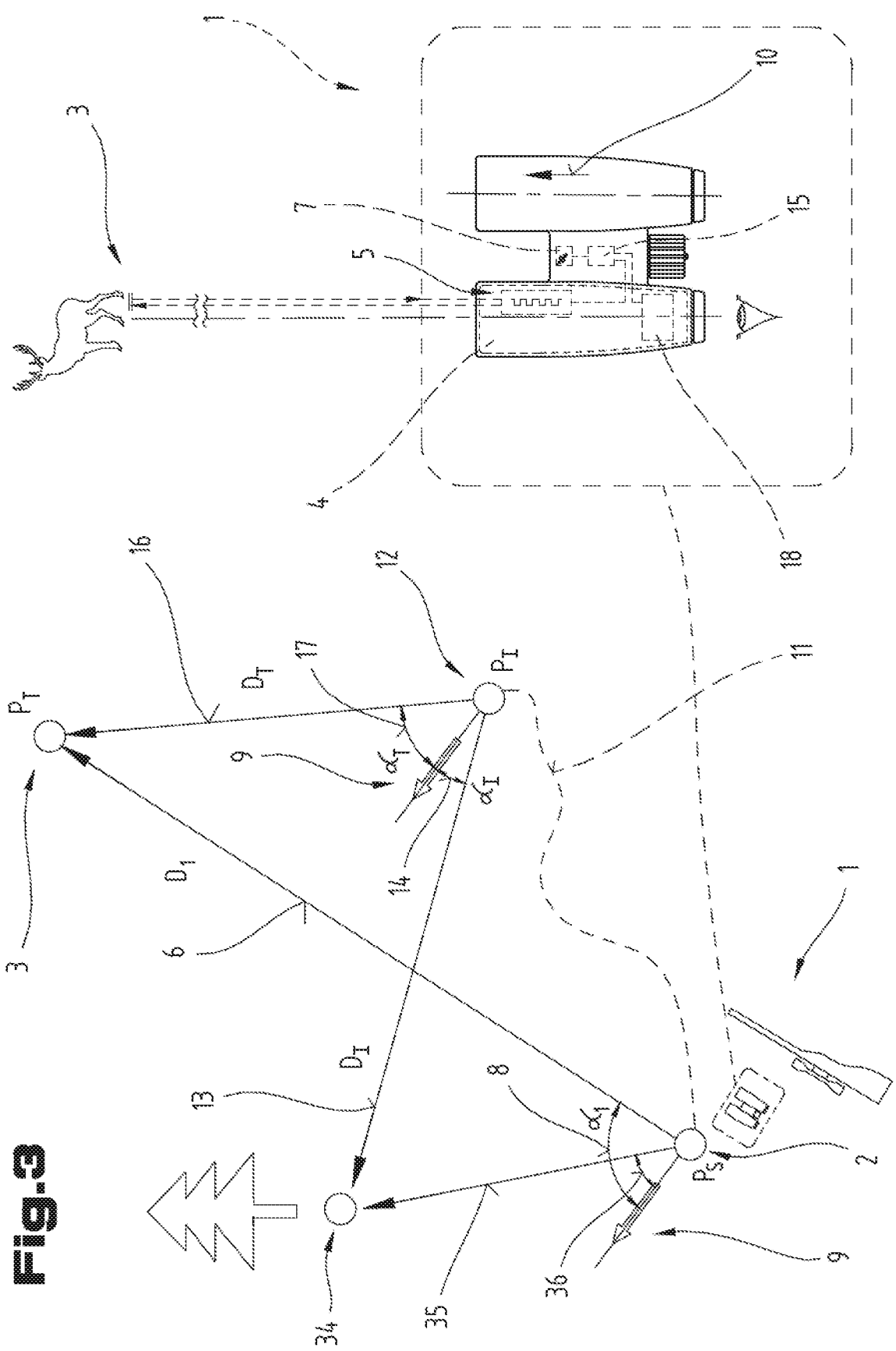

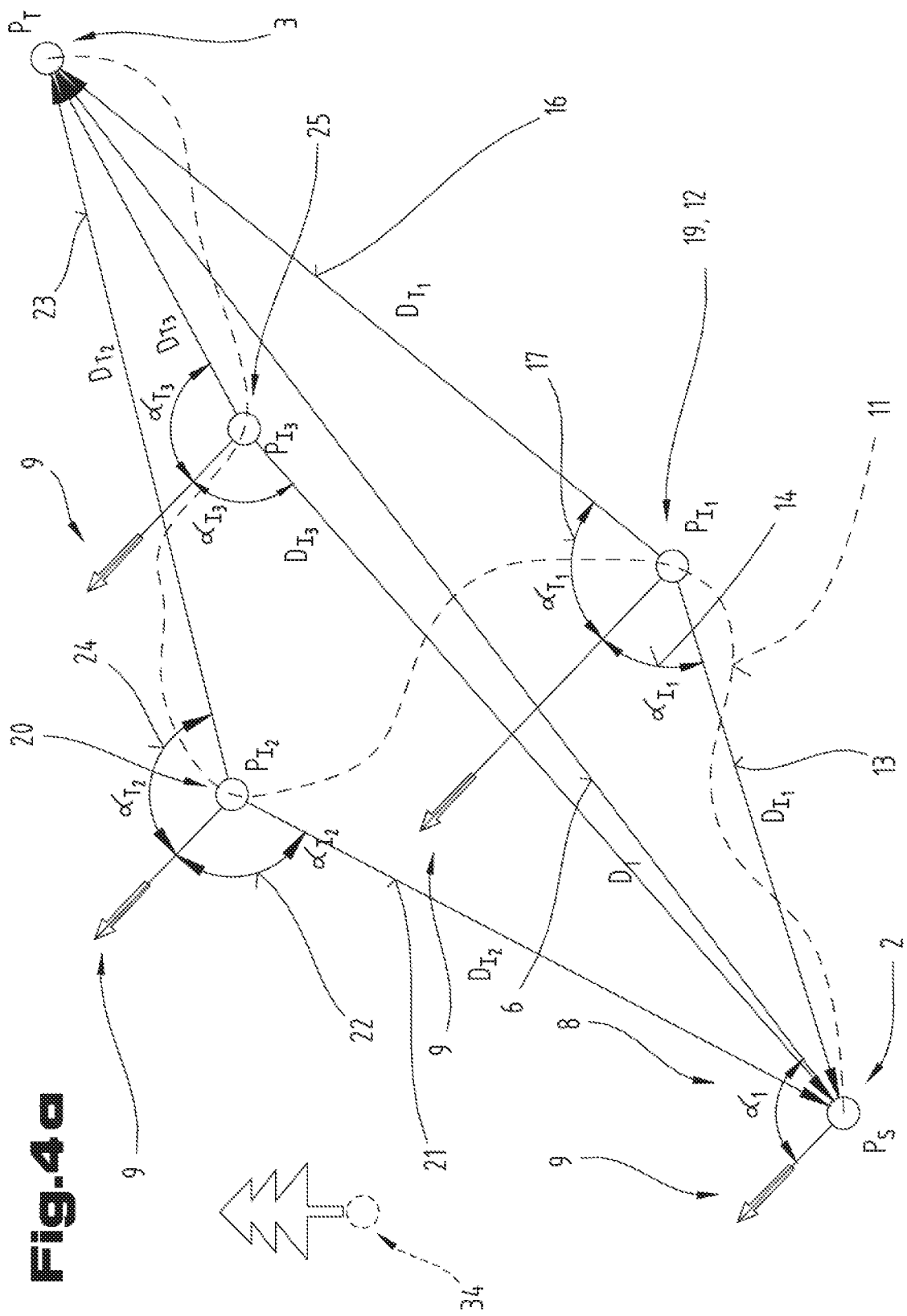

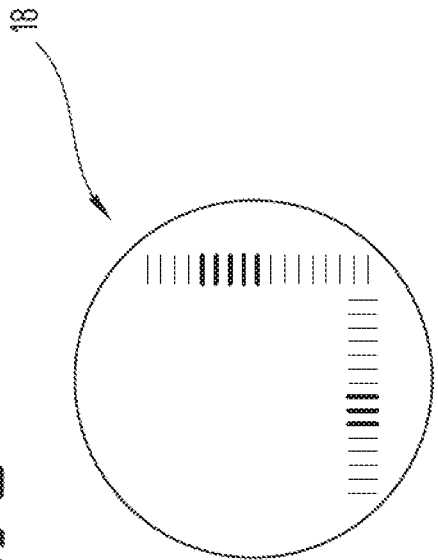
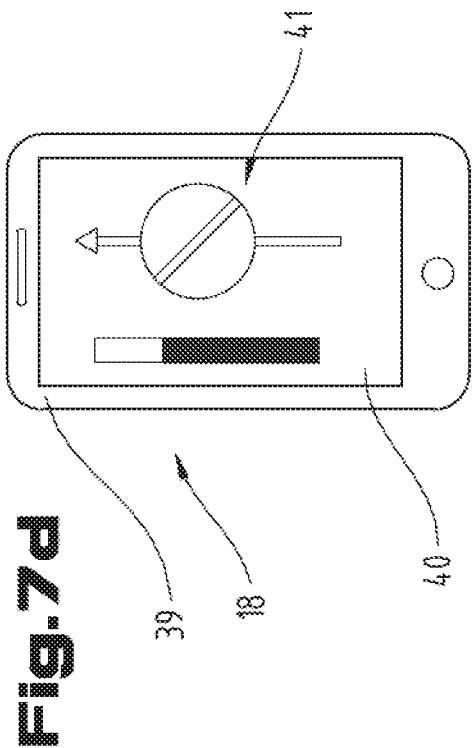
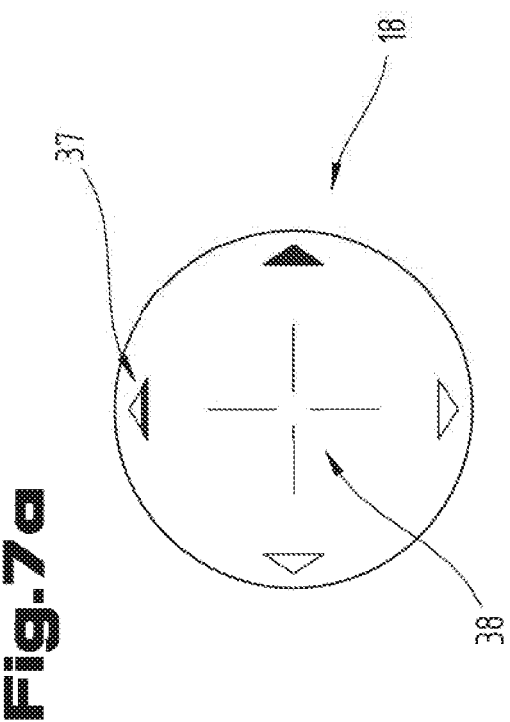
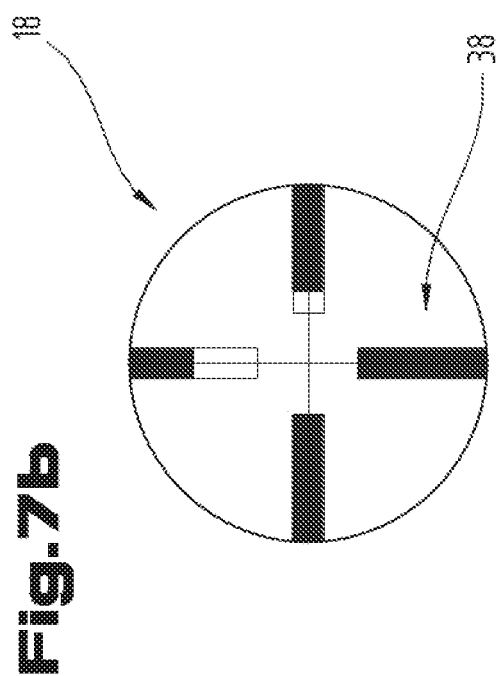

METHOD FOR APPROACHING A TARGET

BACKGROUND OF THE INVENTION

The invention relates to a target approach method with a long-range optical device.

Long-range optical devices, especially for use in hunting, are optimized with respect to their target imaging properties, in particular with respect to the distances encountered in hunting. This is important when the long-range optical device is the riflescope of a hunting rifle. The long-range optical device may also be a pair of binoculars or a telescope (usually also a telescope with an observation optics) in order to target a distant object. Modern riflescopes or binoculars, in particular modern long-range optical devices, usually also have a distance measuring device. Preferably, this distance measuring device is arranged on the long-range optical device so that the measuring direction or the measuring beam exactly matches the line of sight, in particular the optical axis of the long-range optical device. This ensures that when targeting an objective through the long-range optical device, the measuring axis for determining the distance between the optical device and the target, exactly matches the line of sight and thus avoid any target errors and incorrect measurements.

Modern long-range optical devices also comprise an orientation determination device in order to be able to determine or indicate the spatial line of sight, in particular with respect to the cardinal points and the horizontal plane.

If a point-of-interest (POI) is targeted and the bearer of the long-range optical device wants to reach the target position, it is known how to determine the current position of the long-range optical device, for example from U.S. Pat. No. 9,068,800 B2 and also from U.S. Pat. No. 9,335,121 B2. A digital map is updated on the basis of the determined distance and directional information, and the map is kept up to date continually as a result of the movement of the bearer of the long-range optical device. The current position of the bearer or the long-range optical device is determined by means of a satellite-based global positioning system (GPS).

DE 201 11 501 U1 also discloses a GPS-based position determination device which updates a display, in particular a map display, on the basis of the determined position as well as the distance and direction to the target.

Another similar embodiment of such a device is shown in US 2012/0109577 A1, U.S. Pat. Nos. 5,825,480 A, 8,314,923 B2.

BRIEF SUMMARY OF THE INVENTION

The problem with prior art solutions is that those systems are dependent on a global positioning system, in particular, wherein that is, in particular, a satellite-based positioning system. Due to local conditions, it may often occur when moving over terrain that a free view upwards is restricted, and thus too few satellites can be reached for a reliably accurate position determination. It may also happen that the signal quality is insufficient and the location accuracy is accordingly inaccurate. Although the satellites are moving continuously, it may be impractical for a user of a long-range optical device to wait for a sufficient number of satellites to emerge in order to obtain a sufficiently accurate position determination. Furthermore, since in many cases the absolute position of the bearer of the long-range optical device and also the absolute position of the target are of little or no importance, an absolute position determination is usually not necessary.

Furthermore, in known prior art systems, the position of the bearer or, more precisely the long-range optical device, is determined continually or cyclically by means of the global positioning system, and the map display is updated. This implies unnecessary technical equipment expense and is, in particular, disadvantageous in terms of the longest possible autonomous operation due to the associated increased energy consumption. Furthermore, it is a disadvantage that positioning systems, in particular satellite-based systems, require a clear line of sight to the sky in order to be able to effect the positioning determination. However, this is often not possible in the field, so that the position determination may then only be carried out very inaccurately or not at all. During hunting and/or observation activities, it may happen that the hunter/observer must assume a protected or covered position and thus the required upwards line of sight is missing or is restricted. After leaving the position, the observer would then have to wait until a stable position determination was obtained, which might require some time, or, which would be significantly less favorable, the observer would have to start with an inaccurately determined position or move into an area where there is a sufficient upwards line of sight. In practical terms, however, this has significant disadvantages, since, in any event, time is lost in the approach to the target.

The object of the invention to find a method for a modern long-range optical device which uses existing long-range optical device systems, in particular a system for determining the distance to an objective and the orientation of the long-range optical device. Dependence on additional systems or services known from the prior art and based on determined distance information and determined orientation, should be avoided. The object of the invention, in particular, is thus to allow an immediate start of the approach to an objective based only on existing information.

The objective in this context is not to be understood merely as an animal in the hunting sense, but any scene or object of particular interest, i.e. a point of interest, observed by an observer with a long-range optical device, such as prominent landscape sites or geological formations, sights, buildings or people.

This object is achieved by a method according to the claims.

The method according to the invention relates to a target approach method with a long distance optical device, wherein the long-range optical device comprises an observation optics, a distance measuring device and an orientation determination device. The method includes an adaptation step in which an intermediate position, a reference position, a reference distance and a reference angle to the objective at an objective position, are targeted by the observation optics, and the orientation determination device determines a difference angle between an absolute direction and a reference direction of the long-range optical device. The distance measuring device determines a difference distance between the intermediate position to the reference position, and a geodetic calculation module determines the distance and the angle to the objective from the reference distance and the difference distance, as well as from the reference angle and the difference angle.

The particular advantage of this method is that the approach to the objective may begin or restart from an intermediate position anywhere along the route from a starting position to the objective at the target position. In particular according to the invention, it is provided that a reference distance and a reference angle to the target are known from a reference position which may be sighted from the intermediate position. It would be advantageous if, upon approaching the objective, a starting point, for example the starting position, is visible throughout the entire route and may thus be targeted. Due to local circumstances, a situation may arise on the route to the objective wherein this starting point is no longer visible or able to be targeted. The embodiment according to the invention ensures, even in such a case, that an approach to the objective is always possible by using a reference position as a new reference point for the determination of the direction of movement to the objective. This reference position may be formed, for example, by a landscape element that is visible from afar, or by a structural feature.

Another advantage of this method lies in the fact that by means of devices, in particular a distance measuring device and an orientation determination device, which are present on modern long-range optical devices, a target approach is possible without additional navigation systems being required. Such additional systems lead to an additional technical equipment expense and may not work reliably when moving over the terrain, because, for example, the required upwards line of sight is not possible due to spatial restrictions.

According to one development, it is provided that the method has a referencing step. In this referencing step, a second position is targeted from one position by means of the observation optics, wherein the distance and the angle to the objective at the target position are known from one of the positions. A difference distance between the two positions is determined by means of the distance measuring device, and a first angle between an absolute direction and a reference direction of the long-range optical device is determined by means of the orientation determination device. The distance and angle from the one position to the objective at the target position are determined by the geodetic calculation module from the difference distance and the first angle as well as the known distance and the angle to the objective at the target position of the other position. This determined distance and this angle are set as the reference distance and reference angle of the previously undetermined position, so that this position thus becomes a reference position. In particular, at least one start position is determined by measuring the target position as the reference position after these steps. With this development, it is possible for a user to specify an arbitrary position as the reference position or to determine a position measured thereby as the new reference position. In particular, the start position is thus determined as the reference position.

According to one development, it is provided that the long-range optical device further comprises an inclination measuring device, wherein a difference elevation angle is determined in the adaptation step starting from the intermediate position, and the geodetic calculation module determines a target elevation angle from a reference elevation angle and the difference elevation angle, and this is taken into account when calculating the target distance and the target angle. If the elevation difference between the starting and finishing positions is small and the terrain between the starting and finishing positions is substantially flat, then ignoring the target elevation angle would result in a negligible error. In the event of a large elevation difference and/or hilly terrain, then consideration of the elevation angle or the difference elevation angle leads to a significant improvement in the approach accuracy.

In this regard, according to one development, it is also provided that the long-range optical device further comprises an inclination measuring device, wherein a difference elevation angle is determined when targeting a position in the referencing step, and a reference target elevation angle is determined by the geodetic calculation module from the differential elevation angle and a known elevation angle of a position. The advantages of considering an elevation difference have already been described above.

There is also a development wherein the determined target distance, the determined target angle and/or the determined target elevation angle are displayed on a display, wherein both numerals and graphic indicators may be used to illustrate the numerical values. It is also advantageous in this regard if the display means is arranged in or on the long-range optical device, preferably in the observation optics. This development has the particular advantage that the determined direction to the objective is directly represented or indicated in the viewing area of the user. It is particularly advantageous if the display means is arranged in the observation optics, because then the user obtains the information directly when observing the target position and thus does not need to displace the long-range optical device.

There is an advantageous development wherein the adaptation step is carried out again at a further intermediate position that is spatially distant from the previous intermediate position, wherein the intermediate position is equal to the start position, the determined target distance to the first distance, and the target angle to the first angle is determined, and that, optionally, the difference elevation angle to the first elevation angle is determined. This forms an iterative process that involves a piecewise approach to the target. A direct route to the objective is sometimes not possible, especially when moving over rough terrain, wherein the objective may only be reached via one or more intermediate positions. Thus the correct direction and distance to the objective may always be determined along the route and displayed to the user of the long-range optical device through the representational development.

According to one development, it is further provided that the adaptation step is carried out again at a further intermediate position that is located at a spatial distance from the previous intermediate position. If, on the way to the target position, a situation arises that makes sighting of the starting position no longer possible, then, according to this further development, it is also possible to change from the starting position as the original starting reference to an explicit reference point as the starting reference. It is also possible that while on the way, the situation arises that the starting position is again targeted. With this development, it is also possible to change from an explicit reference position back to the starting position as the starting reference.

Another advantage is also a development, according to which the orientation determination device is in the form of a compass, and the north direction is set as the absolute direction. A compass, in particular an electronic compass, is very compact nowadays and is sufficiently accurate and inexpensive, so that such a compass may be easily integrated into a long-range optical device. The use of a compass with the north direction as the absolute direction has the further advantage that such a device always, and in particular without regular adjustment, provides a globally valid absolute orientation as the reference orientation. Since, according to the target approach method, a relative and absolute orientation is no longer necessary, the requirements for the orientation determination device with respect to absolute measuring accuracy are not too demanding; what is important is good repeatability.

If the long-range optical device moves while approaching the objective, it may occur due to local circumstances that the current direction of movement deviates from the target direction determined at the start position or intermediate position. According to one development, it is therefore provided that the absolute direction is determined continuously or cyclically by the orientation determination device and is displayed on the display means. Thus, the bearer of the long-range optical device always receives a current representation of the absolute direction and can estimate the direction to the objective with basic orientation knowledge.

One development also consists in the distance measuring device comprising a light source for the directed output of pulsed light, in particular a laser or an LED. In a first case, the target distance and the target angle, and optionally the target elevation angle, as the first direction information, or, in a second case, the first distance and the first angle, and, optionally, the first elevation angle, as the second direction information, are optically transmitted by means of the distance measuring device to a remote station via a modulation of the light from the distance measuring device. The relative distance and the relative angle between the transmitter and the receiver are also transmitted or automatically determined during transmission. This makes it possible to determine the relative location of the receiver with respect to the transmitter through the distance and angle by means of the geodesic/trigonometric calculation module. The relative location of the receiver is important in determining the relative location of the objective with respect to the receiver from the data transmitted. In this case, the long-range optical device is located at the intermediate position (case I) or the start position (case II), while the remote station is at a spatially-distant transfer position. This advantageous development makes it possible to transmit the target position or the adapted direction to the objective/POI, to one or more remote stations, in particular to another long-range optical device which supports the representational method. When moving over the terrain, it may happen that a second person as a bearer of the remote station may be in a spatially more favorable position and/or closer to the target position. With this development, the objective may be transmitted to this second person, so that this latter person may then effect or continue the target approach. In the terrain, communication between the persons concerned and, in particular, the transmission of the target position may be difficult because of the distance or a requirement to maintain silence, for example when hunting game. With this development, it is advantageously achieved that the target position or the direction to the objective may be transmitted reliably and to the exclusion of communication errors. Furthermore, the first person or the first long-range optical device is understood to be that person or device which has targeted the objective and transmits the objective direction information to the second person, the second device or the remote station. Of course, the transfer takes place optically between the long-range optical device and the remote station by means of a distance measuring device.

Should the receiver(s) be located in the immediate vicinity/proximity to the transmitter, the determination of the relative position between the transmitter-receiver may be omitted and the transmitter position may be further worked on. This means that only the distance and the angle of the transmitter have to be transmitted to the target. In this case, it is also possible or provided that the target position is transmitted by means of wireless communication such as Bluetooth or Wi-Fi between the various devices. This is advantageous, for example, when a group or even a single observer from another nearby observer (guide) has forwarded the target position of a particular objective and has thus made it easier for the observers to find the same objective.

Upon transmitting the target position or the direction to the objective to a second person at a transfer position, the change of location results in the need to recalculate the direction and distance to the objective. Therefore, according to one development it is provided that the remote station in the first case (with reference to the previous explanation and definition) determines the target distance as a reference distance and the target angle as a reference angle for the transmitted first direction information, and optionally also the target elevation angle as the reference elevation angle. Then, the adaptation step is performed again, wherein the current intermediate position of the long-range optical device is determined as the start position. This variant corresponds to the case in which the first person effected the target acquisition and at least one adaptation step. For example, the approach route may indicate that a second person is in a more favorable position and is sent the target position. In the second case the adaptation step is performed or performed again by the remote station for the transmitted second direction information. By this is meant that only the target position determination step is performed by the first person, and then the determined target position is transmitted to the second person.

One further development consists in the fact that the display means is formed by a mobile data terminal, wherein there is a wireless communication link between the long-range optical device and the mobile data terminal, via which are transmitted the determined target distance and the determined target angle, and if appropriate the target elevation angle. A mobile data terminal may be in the form, for example, of a smartphone, tablet, smart-watch or the like. An advantage of this design is that such mobile data terminals are technically advanced and, in particular, have at least one display means and usually a plurality of different communication interfaces. Furthermore, such devices are widely used and are, for the most part, always carried. The high-frequency communication link may be, for example, Bluetooth, ZigBee, WLAN, NFC or an equivalent communication system.

Of particular advantage is a further development, according to which the mobile data terminal device also has an orientation determination device, in particular an electronic compass, wherein an orientation angle between the orientation of the data terminal and the absolute direction is determined by the orientation determination device of the data terminal. The transmitted target angle is converted into the orientation angle, and the difference angle determined thereby is displayed on the display means. Thus, the user may be given a visual representation of the direction in which the objective is located via the display means. If this orientation determination is carried out cyclically or triggered manually, the user on the target approach route always has current information on which direction the objective is located.

A further possible embodiment is where the data terminal has an acceleration sensor which detects movement of the data terminal and transfers this as a movement vector to the geodetic calculation module, which continually or cyclically updates this based on the reference distance and the reference angle, and the difference distance and the difference angle, and possibly the difference elevation angle and the first elevation angle, the target distance and the target angle and, where appropriate, the target elevation angle. With this development, the direction to the objective, in particular the distance and the target angle, is adjusted as a function of the movement information determined during the movement and then provided to the user.

One development also consists in that the display means is so arranged on the observation optics that the representation of the target distance and the target angle is superimposed in the beam path of the observation optics. This development has the advantage that the bearer of the long-range optical device does not need to effect any additional action in order to obtain the determined values. Immediately after the target position determination step or the adaptation step, the bearer of the long-range optical device receives the information directly in their field of view. The representation of the direction may be indicated, for example, by specifying a numerical value of the target angle, by displaying a directional arrow, or by orientation marks.

One further development consists in the target distance and the target angle and optionally the target elevation angle being displayed on the display means as one of a group comprising directional arrows, scale range, orientation vector, bar graph, and alphanumeric representation. Directional arrows may be displayed on the edge or in the middle and, for example, by varying the size and/or representation intensity, may specify the amount in a given direction and/or how far the long-range optical device has to be pivoted in order to target the objective. An orientation vector allows a combined representation in the form of a single directional arrow. Rotating against a fixed direction indicates how the long-range optical device needs to be aligned. The distance may be visualized by the length of the vector. A bar graph may work in a similar manner to the directional arrows. In particular, the bars of the reticle (for example, reticle 8) may represent direction information by varying the filling of the bars. Similarly, a bar display may be formed or function. These designs allow a qualitative representation of the target direction, which may be read and noted by the user at a glance. An alphanumeric representation allows an almost arbitrarily detailed specification of the objective information, but this also requires a reading and processing step by the user. Details on possible forms of representation may be found in the figures.

One further development may also comprise at least one reference position being stored in the geodetic calculation module. To prepare or plan a movement over the terrain, prominent reference positions may be determined in advance, and at least one may be stored in the geodetic calculation module. For this purpose, the geodetic calculation module may, for example, be connected to a data processing system. This development is advantageous because it allows a position of the long-range optical device to be determined with respect to an absolute coordinate system. This absolute position may be used in other navigation systems in order to provide additional navigation services, for example, more long-range route guidance, and to people not accessible by optical and/or acoustic means.

BRIEF DESCRIPTION OF THE DRAWINGS

For a better understanding of the invention, this will be explained in more detail with reference to the following figures.

A highly simplified, schematic representation is shown in each case:

FIG. 3 shows a target position determination step by means of an explicit reference point and an adaptation step according to the inventive method;

FIG. 7a to d show examples of possible representations of the determined target distance and the determined target angle on a display means.

DETAILED DESCRIPTION

To illustrate the method steps, the long-range optical device is shown in a schematic detail in FIGS. 1 to 3 and 5. This detail shows binoculars in one possible embodiment.

Figure 1:
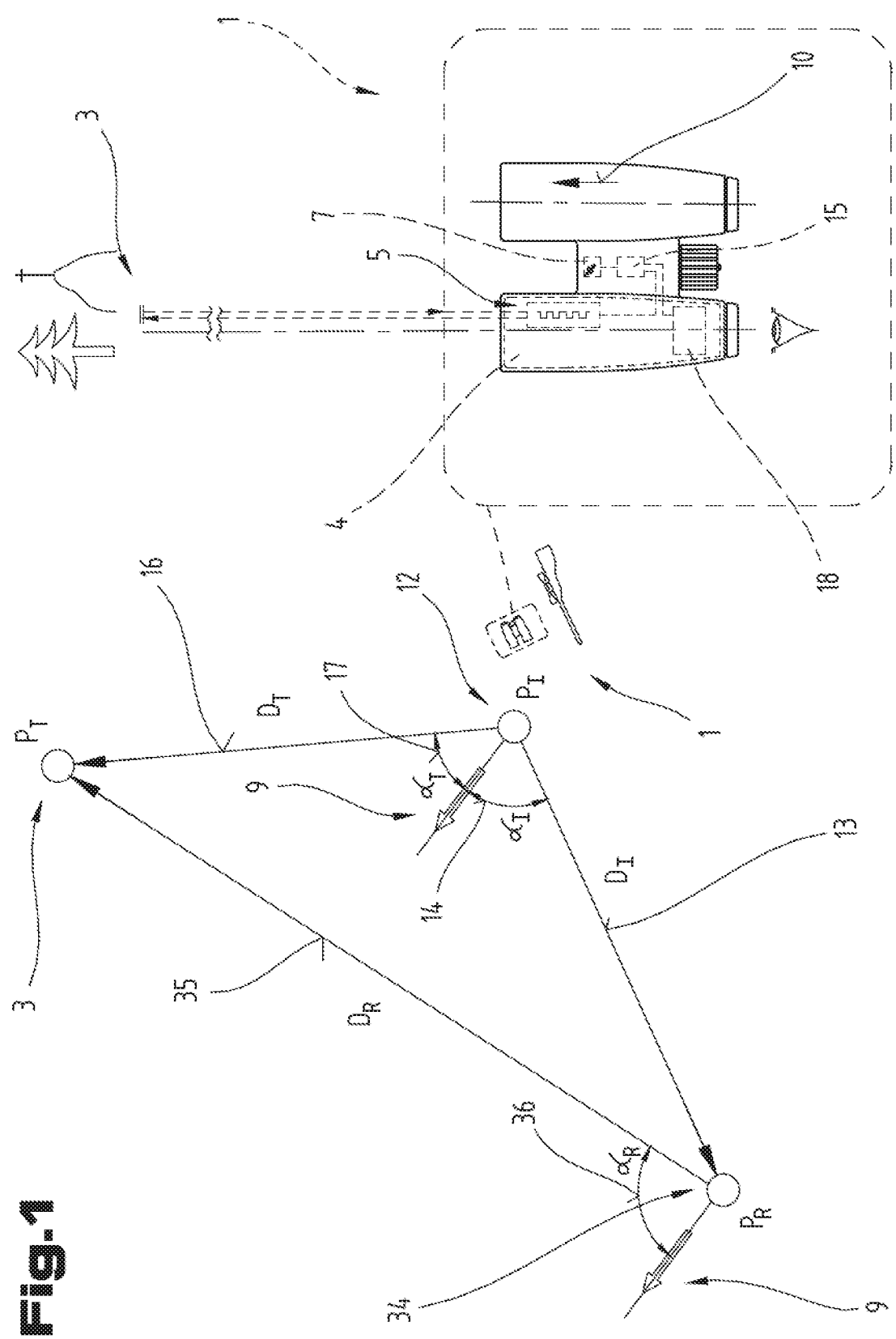
FIG. 1 shows the adaptation step of the objective target approach method.

FIG. 1 shows the inventive target approach method implemented with/by a long-range optical device 1, wherein this device comprises an observation optics 4, a distance measuring device 5 and an orientation determination device 7. Upon approaching the objective at the target position 3 (PT), a situation may arise where the objective will no longer be visible. The bearer of the long-range optical device 1 therefore needs a way to be able to determine at their current position the direction and distance to the objective in order to be able to continue the approach to the objective. At an intermediate position 12 (PI), therefore, a reference position 34 (PR) is targeted by the bearer of the long-range optical device 1, for example by viewing the reference position 34 through the observation optics 4 and triggering the adaptation step. This reference position 34 is characterized by the fact that it is stationary and is located at a position, or due to their dimensions or a predominant element, may always be seen along the route. This may be, for example, a widely visible terrain mark, a solitary tree or a transmission mast.

In the adaptation step, the distance measuring device 5 determines the difference distance 13 between the long-range optical device 1 and the reference position 34. Furthermore, a difference angle 14 between an absolute direction 9 and a reference direction 10 of the long-range optical device 1 is determined by means of the orientation determination device 7. The earth's magnetic field is preferably chosen as the basis for determining the absolute direction 9, since this is always available without interference, especially in open terrain. The orientation determination device 7 in this case is a compass, usually an electronic compass.

The reference position 34 characterizes another feature, namely that the distance (reference distance 35) and the angle with respect to the absolute direction 9 (reference angle 36) from this reference position 34 to the target are known. For example, these values may be determined in an upstream referencing step, as described in a subsequent figure.

Since the relative position (reference distance 35 and reference angle 36) is known from the reference position to the target position 3, the geodetic computer module 15 can use the determined position from the intermediate position 12 to the reference position 34 (difference distance 13 and differential angle 14) by means of trigonometry, wherein the position to the objective at the target position 3 (target distance 16 and target angle 17) may be determined.

The particular advantage of the inventive method is that a bearer of the long-range optical device 1 may perform the target approach method, at any point along the route, even when the objective has been lost sight of or is no longer visible, and they may redefine the direction and distance to the objective at any time. In particular, this determination is possible with high accuracy, since reference is repeatedly made here to a reference point.

Figure 2:
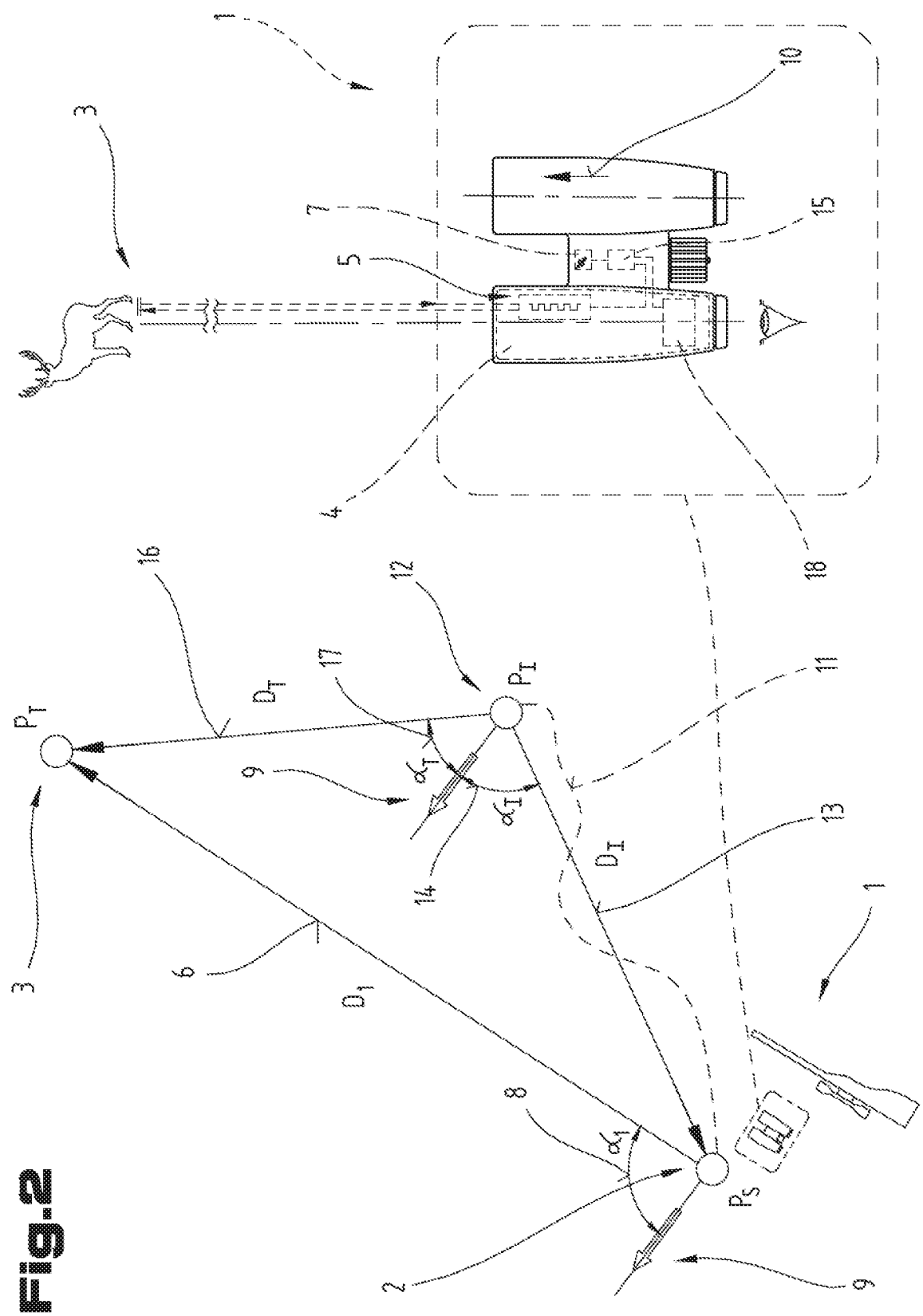
FIG. 2 shows a target position determination step and an adaptation step according to the inventive method.

FIG. 2 shows a possible application of the inventive target approach method. A bearer of a long-range optical device 1 is located with the long-range optical device at a start position 2. At this start position 2 (PS), an objective is displayed at a target position 3 (PT) by means of the long-range optical device 1.

In a target position determination step at the start position 2, the objective at the target position 3 is targeted by means of the observation optics 4. A first distance 6 from the starting position 2 to the target position 3 is determined by means of a distance measuring device 5. This distance measuring device 5 is a contactless distance measuring device and is in the form, for example, of a laser rage finder.

In addition, the long-range optical device 1 has an orientation determination device 7, which determines a first angle 8 between an absolute direction 9 and a reference direction 10 of the long-range optical device 1 when aiming at the objective. In one possible embodiment, the orientation determination device 7 is in the form of a compass, preferably an electronic compass, so that the absolute direction 9 is the north direction.

Upon approaching the target position 3, the bearer of the long-range optical device 1 moves on a route 11 to an intermediate position 12 (PI). Due to spatial conditions, in particular due to the form of the terrain, this route 11 is usually not straight, and orientation with respect to the objective may be difficult, or the objective may be lost sight of.

Therefore, according to a possible variant of the method according to the invention, an adaptation step is provided in which the start position 2 targets the intermediate position 12 that is spatially distant from the start position 2 by means of the observation optics 4, and by means of the distance measuring device 5 to determine a difference distance 13 from the intermediate position 12 to the start position 2. In addition, a difference angle 14 between the absolute direction 9 and the reference direction 10 of the long-range optical device is simultaneously determined by means of the orientation determination device 7. From the first distance 6 and the first angle 8, as well as the difference distance 13 and the difference angle 14, a new and current target distance 16 and target angle 17 are determined by a geodetic calculation module 15 by means of trigonometric calculation methods. The determined target distance 16 and the determined target angle 17 are accordingly displayed to the bearer of the long-range optical device 1 on a display means 18. On the basis of these data, the bearer of the long-range optical device 1 can adapt and continue their approach to the objective 3.

FIG. 3 shows a further possible alternative variant of the inventive target approach method, which uses an explicit reference position 34 as the basis for the target navigation. This variant is an extension of the variant shown in FIG. 1 and has, as already described in FIG. 1, the particular advantage that in rough difficult terrain, an exceptional feature is used as the basis for the target navigation.

Due to topological circumstances, the user of the long-range optical device may recognize that the start position 2 along the approach to the target position 3 may only be partially targeted. In this case, the reference position 34 is targeted by means of the observation optics 4 in the target position determination step, and a reference distance 35 is determined from the start position 2 to the reference position 34 by means of the distance measuring device 5. A reference angle 36 between the absolute direction 9 and the reference direction 10 of the long-range optical device 1 is determined by means of the orientation determination device 7. In the adaptation step, the reference distance 16 and the target angle 17 are determined by the geodetic calculation module 15 from the reference distance 35 and the reference angle 36, as well as the difference distance 13 and the difference angle 14.

If, on the route, a situation arises wherein the selected reference position disappears from the line of sight, the referencing step may be carried out again in order to determine a new reference position. The new reference position to be used then on is targeted, and from the known distance and the known angle to the objective (this will usually be the target distance and the target angle of the current position), and from the determined difference values (these are usually the difference distance and the difference angle), a new reference distance and a new reference angle are determined. Thus, reliable navigation to an objective is possible even over long distances.

Figure 4B:
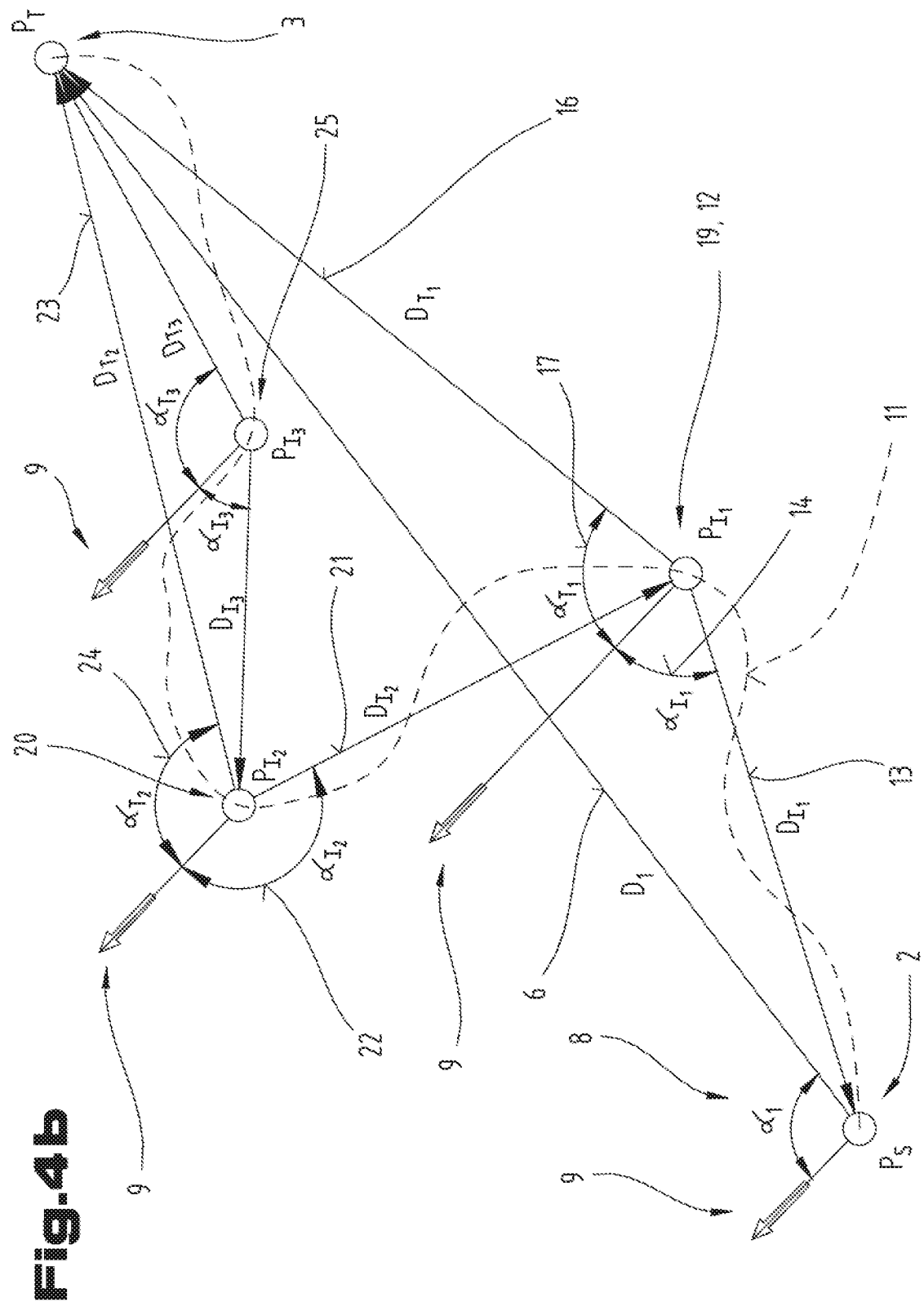
FIGS. 4a and b show a target approach according to variants of the inventive method.

FIGS. 4a and b show the inventive target approach method during iterative execution of the adaptation step along the route 11 to the target position 3. In FIG. 4a, the start position (start position 2 or reference position 34) is always targeted; the respective last position is targeted in FIG. 4b.

FIG. 4a shows the situation wherein reference is always made back to the start position of the route 11 along the route 11. In FIG. 4a, this is the start position PS 2. In the target position determination step, the first distance D1 6 and the first angle α1 8 to the objective at the target position PT 3 are determined from the start position PS 2.

The bearer of the long-range optical device then moves on a route 11 in the direction of target position 3. At a first intermediate position PI1 19, 12 an already described adaptation step is carried out while the first difference distance DI1 13 and the first difference angle αI1 14 are determined. From the first distance D1 6 and the first angle α1 8 determined in the target position determination step, the first target distance DT1 16 and the first target angle αT1 17 are determined and displayed to the bearer of the long-range optical device via the display means.

Thereafter, the bearer of the long-range optical device moves along the route 11 to the second intermediate position PI2 20 and there executes the adaptation step again in order to determine a second difference distance DI2 21 and a second difference angle αI2 22. From the first distance D1 6 and the first angle α1 8, and the second difference distance DI2 21 and the second difference angle αI2 22, a second target distance DT2 23 and a second target angle αT2 24 are determined.

The bearer of the long-range optical device moves along the route 11 to the third intermediate position 25 and carries out the adaptation step there again. A detailed description of the individual procedures is dispensed with, since they resemble the steps in the adaptation step at the second intermediate position 20. In the adaptation step, a third difference distance DI3 and a third difference angle αI3 are determined and, as before, a third target distance DT3 and a third target angle αT3 are determined.

If, instead of the start position 2, a reference position 34 is used as the basis for the target navigation, the described case II is carried out in the adaptation step. The reference position is targeted and the reference distance or reference angle is used by the geodetic calculation module to determine the target distance and the target angle. All other described procedures remain the same.

Referring to FIG. 4b, in the first target position determination step, the first distance 6 and the first angle 8 are determined from a start position 2 to the target at the target position 3. The bearer of the long-range optical device then moves along a route 11 and there performs the adaptation step already described above. At a first intermediate position 19, 12, the first difference distance 13 and the first difference angle 14 are determined, and the first target distance 16 and the first target angle 17 are determined from the first distance 6 and the first angle 8 in the target position determination step. Then, the bearer of the long-range optical device moves along the route 11 to the second intermediate position 20 and carries out the adaptation step there again. However, the first intermediate position 19 is now targeted as the start position of the adaptation step, and a second difference distance 21 and a second difference angle 22 are determined. A second target distance 23 and a second target angle 24 are determined from the target distance 16 as the first distance of the adaptation step and the target angle 17 as the first angle of the adaptation step, and the second difference distance 21 and the second difference angle 22.

The bearer of the long-range optical device moves along the route 11 to the third intermediate position 25 and carries out this adaptation step there again with the second intermediate position 20 as the start position of the adaptation step. A description of the individual procedures is dispensed with since they are similar to the steps in the adaptation step at the second intermediate position 20, wherein the indices must be adapted to the third intermediate position.

With the inventive target approach method, it is now possible, following a first targeting of the target and determination of a distance and an angle to the objective, to achieve the objective along a route by iterative execution of the adaptation step, even if the route is clearly different from the intended route and deviates from a direct connection.

FIGS. 1 to 4 show the situation of the inventive target approach method has been described in a flat terrain, i.e. when only slight differences in height occur between the start and target positions, and in particular along the route between them. In particular, the start and objective as well as the route between them are largely in a horizontal plane. Under these conditions, a purely two-dimensional consideration of the distance and the angle is sufficient and the height components of the route may be ignored.

Figure 5:
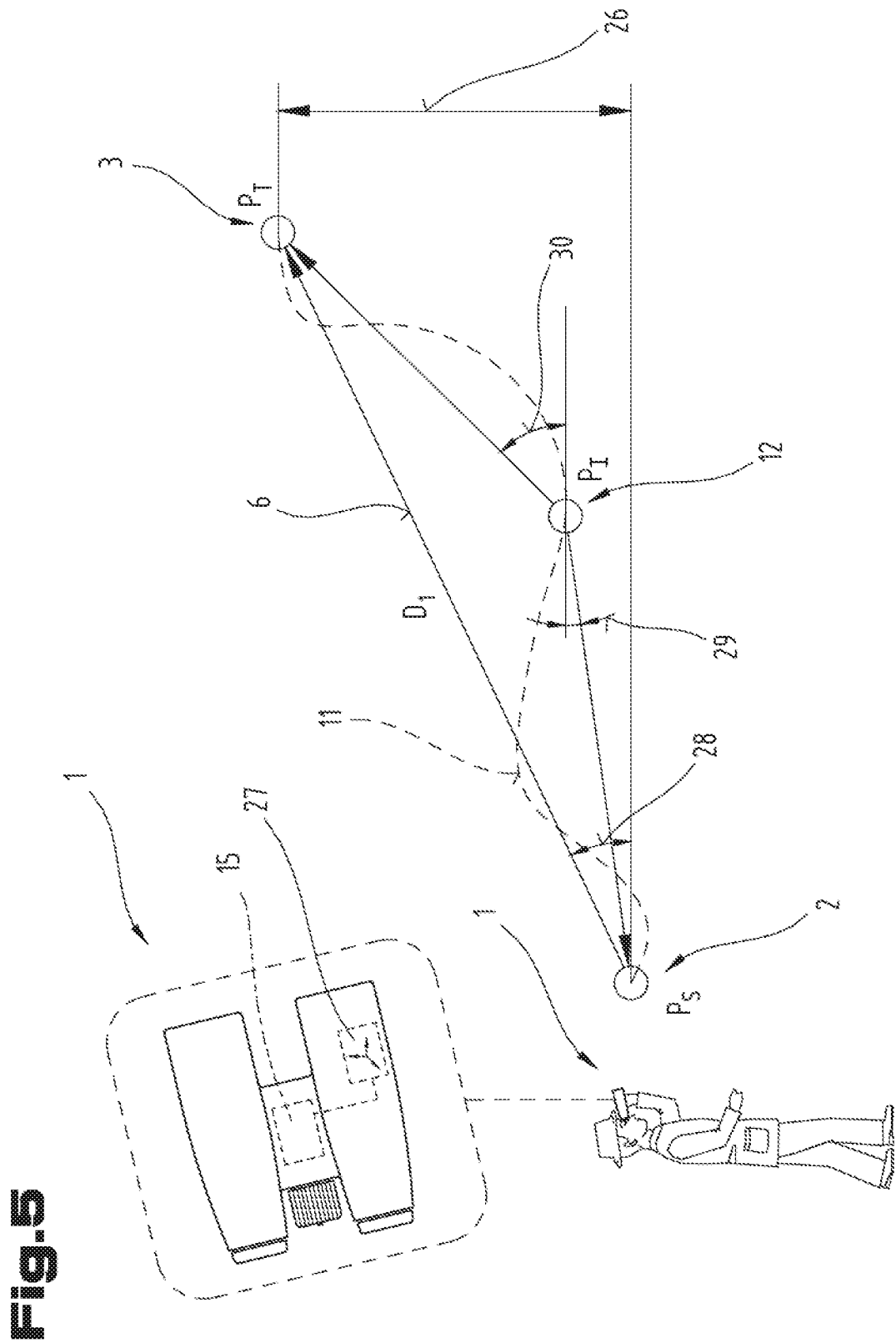
FIG. 5 shows consideration of elevation differences according to the inventive method.

In reality, however, it is likely that there will be a difference in elevation between a start position and the target position, and, in particular, differences in elevation (ascents, descents) will have to be overcome along the route between them. FIG. 5 now shows the situation wherein an elevation difference 26 exists between the start position 2 and the target position 3, and wherein the intermediate position 12 is higher than the start position 2 and lower than the target position 3. The route 11 that the bearer of the long-range optical device 1 will travel to the target position 3 may clearly deviate from a straight rise in elevation. In particular, it is possible that in order to reach an intermediate position 12, it may be necessary to overcome a position which is higher than the intermediate position.

According to an advantageous development, the long-range optical device 1 further includes an inclinometer 27 connected to the calculation module 15, which transmits an inclination relative to the horizontal as an elevation angle to the calculation module 15. In this way, the inventive target approach method is extended so that a first elevation angle 28 is additionally determined at the start position 2 when the target position 3 is targeted in the target position determination step. The bearer of the long-range optical device will then move along the route 11 to the first intermediate position 12 and perform the adaptation step there. The start position 2 is targeted and a difference elevation angle 33 is determined. The target elevation angle 30 is determined from the determined first elevation angle 28 and the difference elevation angle 33 by the geodetic calculation module 15.

If several intermediate stations are located on the route between the start position and the target position, the above description is similar to that previously given for the flat route and applies to a route with several intermediate stations.

The detailed representation in FIG. 5 shows only the relevant components of the long-range optical device 1. Reference is made to the description of the preceding figures for further details of the long-range optical device 1.

Figure 6:
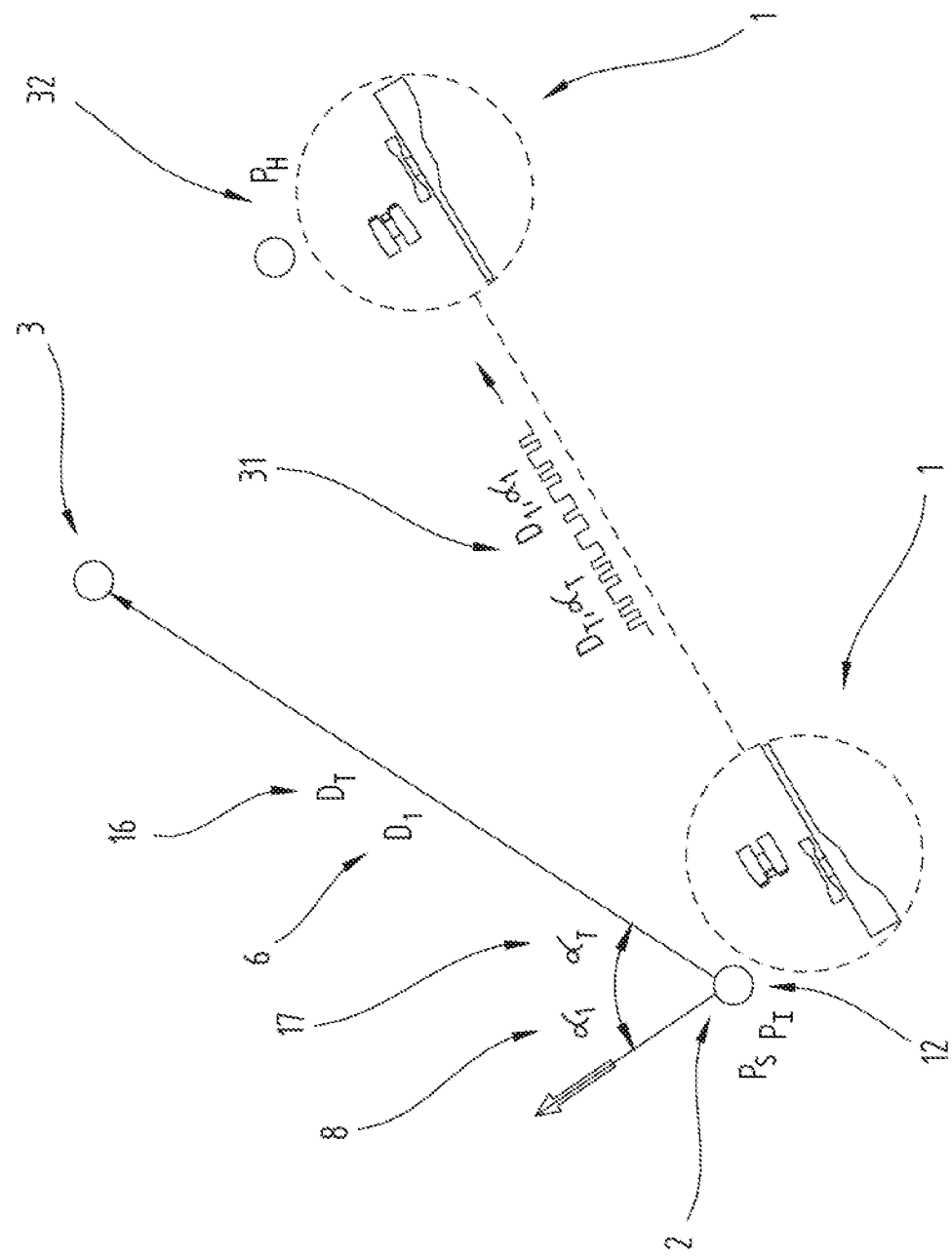
FIG. 6 shows a transmission of the target position to a remote station according to the inventive method.

When moving over the terrain, in particular during a hunt, it may happen that a bearer of the long-range optical device 1 may be able to target the objective well at the start position 2, but wherein the objective may be difficult to reach at the target position 3 due to spatial conditions. Therefore, according to another possible embodiment of the inventive target approach method, it is possible that by means of the distance measuring device of the long-range optical device, the direction information 31 concerning the target may be transferred to a second long-range optical device 1 at a transfer position 32 as schematically shown in FIG. 6. Preferably, the distance measuring device of the long-range optical device is designed as a laser distance measuring device which emits a sequence of laser pulses and determines the distance to the target from determination of the transit time. It may be provided that the direction information may be transmitted in a packet through these pulses or pulse pauses. Thus, the second long-range optical device needs to be targeted by the bearer of the first long-range optical device and the transmission of the direction information needs to be triggered.

If the bearer of the first long-range optical device is at the start position 2 and has not yet carried out an adaptation step, the first distance 6 and the first angle 8 are transmitted as the second direction information 31 as the direction information 31. However, it is also possible that the bearer of the long-range optical device 1 has already moved along the route and is now at an intermediate position 12, from where the further route becomes difficult. The adaptation step is thus carried out at the intermediate position 12 by the bearer of the first long-range optical device, and the target distance 16 and the target angle 17 are transmitted to the second long-range optical device as first direction information 31.

Since the second long-range optical device is located at a different position than the start point for the preparation of the direction information, the direction information to the objective at the target position 3 must be determined again. Likewise, during the transfer, the difference distance and the difference angle between the first and the second long-range optical devices are determined.

From the long-range optical device 1 at the transfer position 32, therefore, the adaptation step is carried out, wherein the start position 2 or intermediate position 12 of the transferring long-range optical device 1 is set as the start position of the adaptation step. However, it is also possible for the adaptation step to be carried out by the long-range optical device 1 at the start position 2 or at the intermediate position 12, wherein the physical start position or the physical intermediate position of the long-range optical device is defined as the start position of the adaptation step. This case corresponds to a forward calculation of the target distance or the target angle, since before the transfer of the direction information to the second long-range optical device 1 at the transfer position 32, the target distance and the target angle have already been determined.

The advantage of this embodiment is, in particular, that the transmission of direction information is possible without additional communication means and, in particular, while avoiding data loss, so that a second long-range optical device may seamlessly continue the approach to the objective at a transfer position, when this is not possible for the transferring long-range optical device or only with difficulty.

FIG. 7a to d show examples of possible variants, wherein the determined target distance and the determined target angle are displayed on a display means.

FIGS. 7a to 7c show a view through the long-range optical device, wherein the information is superimposed into the beam path, for example via semi-transparent mirrors. The possibilities of inserting information into the beam path of an optic will not be discussed further here.

FIG. 7a shows direction arrows 37, which may indicate a horizontal and vertical direction. It may be provided that by filling or partial filling of the arrow body the direction arrows represent to the user the direction in which the long-range optical device is to move. When all the arrows are filled/empty, the center of the field of view is aligned with the objective. In addition, the correct orientation could also be represented by an optical effect, for example wherein all direction arrows 37 flash briefly. Alternatively, just one arrow could be provided on the circumference of the display means 18, wherein its position indicates the movement required to orient the long-range optical device. A similar situation is shown in FIG. 7b, except that the elements of the reticle (specifically reticle 8) are used here to represent the orientation information. A filled/empty bar of the reticle 38, as before, would indicate the direction in which the long-range optical device needs to be moved in order to be aligned with the target. For example, the distance between the ends of the reticle 38 could be used to illustrate the distance. Or, in addition, a variable-length bar or the like could be displayed.

FIG. 7c uses scales to represent the orientation information. If only the center scale dividing element is displayed in an enhanced manner, the long-range optical device is aligned with the target. For example, a scale element could flash to represent the distance, or a portion of the scale parallel to the representation of the orientation information could be used as the distance bar.

FIG. 7d shows a data terminal 39, which forms the display means 18, wherein the data terminal 39 may, for example, be a smartphone. A direction arrow 41 and a distance indication 42 are shown on a display 40. The data terminal 39 preferably also has a position determination module, so that its own orientation may be determined and a deviation from the determined target angle may be displayed. When properly aligned, the terminal points exactly in the direction of the target position.

The display means 18 shown in FIG. 7 are non-exhaustive examples of possible variants of how the target angle and the target distance may be displayed to the user of the long-range optical device. Further possible display variants that are not shown, are not explicitly included. There will be a communication connection between the data terminal 39 and the geodetic calculation module, preferably a wireless connection such as Bluetooth, ZigBee or the like.

Finally, it should be noted that in the various described embodiments, the same parts are provided with the same reference numerals or the same component designations, wherein the claims contained in the entire description may be equally applied to the same parts with the same reference numerals or identical component names. In addition, the position references used in the description, such as top, bottom, side, etc. relate to the directly described and illustrated figure and this position information applies equally to a new location upon a change in position.

FIG. 6 shows a further embodiment of the target approach method, which is possibly a stand-alone embodiment in its own right, wherein the same reference numerals or component designations are again used for the same parts as in the preceding figures. To avoid unnecessary repetition, reference is made to the detailed description in the preceding figures.

The embodiments show possible embodiment variants, wherein it is noted here that the invention is not limited to the specifically illustrated embodiments, but rather various combinations of the individual embodiments are possible, and this possibility of variation is based on the teaching of the invention by those skilled in the art.

The scope of protection is determined by the claims. However, the description and drawings are to be considered as interpreting the claims. Individual features or combinations of features from the various embodiments illustrated and described above may represent inventive solutions in themselves. The object underlying the independent inventive solutions may be taken from the description.

All statements of value ranges in the present description are to be understood to include any and all subsections thereof, e.g. the indication 1 to 10 is to be understood as meaning that all subsections, starting from the lower limit 1 and the upper limit 10, are included, i.e. all subsections begin with a lower limit of 1 or greater, and end at an upper limit of 10 or less, e.g. 1 to 1.7, or 3.2 to 8.1, or 5.5 to 10.

For the sake of order, it should finally be pointed out that elements have been shown partially uneven and/or enlarged and/or reduced in size for a better understanding of the construction.

The invention claimed is:

1. A target approach method for use with a long-range optical device including observation optics, a distance measuring device and an orientation determination device, the method comprising:
on a route extending from a starting position to a target position, a user of the long-range optical device moves to an intermediate position;
an adaptation step, wherein at the intermediate position, a reference position with a reference distance and a reference angle relative to the target position is aimed at by means of the observation optics;
a difference angle between an absolute direction and a reference direction of the long-range optical device is determined by means of the orientation determination device;
a difference distance from the intermediate position to the reference position is determined by means of the distance measuring device; and
a target distance and a target angle each are determined by a geodetic calculation module from the reference distance and the difference distance and the reference angle and the difference angle, wherein the geodetic calculation model does not use GPS data in determining the target distance and target angle.

2. The method according to claim 1, comprising a referencing step, wherein from a first position, a second position is targeted by means of the observation optics, wherein the distance and the angle to the target at the target position from the first position are known;
- a difference distance between the two positions is determined by means of the distance measuring device;
- a first angle between an absolute direction and a reference direction of the long-range optical device is determined by means of the orientation determination device;
- the distance and the angle to the target at the target position of the second position each are determined by the geodetic calculation module from the difference distance and the first angle and from the known distance and angle to the objective at the target position from the first position; and
- said determined distance and said angle are set as the reference distance and reference angle of the second position and thus the second position becomes a reference position; and
- wherein by measuring the target position, at least one start position is determined as a reference position after said steps.

3. The method according to claim 1, wherein the long-range optical device further comprises an inclinometer, wherein in the adaptation step, a difference elevation angle is determined when targeting the reference position of the intermediate position, and the geodetic calculation module determines a target elevation angle from a reference elevation angle and the difference elevation angle and takes the target elevation angle into account when calculating the target distance and the target angle.

4. The method according to claim 2, wherein the long-range optical device further comprises an inclinometer, wherein a difference elevation angle is determined when targeting a position in the referencing step, and a reference elevation angle is determined from the difference elevation angle and a known elevation angle of a position by the geodetic calculation module.

5. The method according to claim 1, wherein the determined target distance, the determined target angle and/or the determined target elevation angle are displayed on a display means, wherein both numerals and graphical indicators can serve to illustrate the numerical values.

6. The method according to claim 2, wherein the adaptation step is performed again at a further intermediate position that is spatially distant from the previous intermediate position, wherein the intermediate position equal to the start position, the determined target distance to the first distance, and the target angle to the first angle, and that, optionally, the difference elevation angle is set to the first elevation angle.

7. The method according to claim 1, wherein the adaptation step is performed again at a further intermediate position that is spatially distant from the previous intermediate position.

8. The method according to claim 1, wherein the orientation device is formed by a compass, and the north direction is set as the absolute direction.

9. The method according to claim 1, wherein the absolute direction is determined continuously or cyclically by the orientation determination device, and displayed on the display means.

10. The method according to claim 1, wherein the distance measuring device comprises a laser or an LED for the directed delivery of pulsed light, wherein by means of the distance measuring device
   (I) starting from the long-range optical device, the target distance and the target angle, and optionally the target elevation angle, are given as a first direction information at the intermediate position, or
   (II) starting from the long-range optical device, the first distance and the first angle, and optionally the first elevation angle at the start position are transmitted to a remote station as a second direction information, wherein the remote station is located at a transfer position that is spatially distant from the start position or the intermediate position.

11. The method according to claim 10, wherein the remote station at the transfer position
   (I) determines the target distance as the reference distance and the target angle as the reference angle for the transmitted first direction information, and optionally further determines the target elevation angle as the reference elevation angle, wherein the adaptation step is performed again, or that
   (II) the adaptation step is performed or carried out again for the transmitted second direction information.

12. The method according to claim 5, wherein the display means is in the form of a mobile data terminal, and wherein there is a wireless radio-frequency communication link between the long-range optical device and the mobile data terminal, and via which the determined target distance and the determined target angle, and optionally the target elevation angle, are transmitted.

13. The method according to claim 12, wherein the mobile data terminal further comprises an electronic compass, wherein an orientation angle between the orientation of the data terminal and the absolute direction is determined by means of the orientation determination device of the data terminal, and the transmitted target angle is converted into the orientation angle and the thus determined difference angle is displayed on the display means.

14. The method according to claim 12, wherein the data terminal comprises an acceleration sensor which detects a movement of the data terminal and transfers a movement vector to the geodetic calculation module, which continuously or cyclically updates the target distance and the target angle and optionally the target elevation angle from the reference distance and the reference angle, and the difference distance and the difference angle, and optionally the difference elevation angle and the first elevation angle.

15. The method according to claim 5, wherein the display means is arranged on the observation optics, and that the representation of the target distance and the target angle is superimposed in the beam path of the observation optics.

16. The method according to claim 1, wherein the target distance and the target angle and optionally the target elevation angle are displayed on the display means as one of a group comprising directional arrows, scale range, orientation vector, bar graph, and alphanumeric representation.

17. The method according to claim 1, wherein the reference distance and the reference angle of at least one reference position are stored in the geodetic calculation module.

* * * * *